US009073050B2

(12) United States Patent  
MacDonald et al.

(10) Patent No.: US 9,073,050 B2
(45) Date of Patent: Jul. 7, 2015

(54) ION EXCHANGE COMPOSITIONS, METHODS FOR MAKING AND MATERIALS PREPARED THEREFROM

(75) Inventors: Russell James MacDonald, Wilmington, MA (US); Chakravarthy Gudipati, Singapore (SG); Kai Zhang, Singapore (SG)

(73) Assignee: General Electric Company, Schenectady, NY (US)

( * ) Notice: Subject to any disclaimer, the term of this patent is extended or adjusted under 35 U.S.C. 154(b) by 357 days.

(21) Appl. No.: 13/253,227

(22) Filed: Oct. 5, 2011

(65) Prior Publication Data
US 2013/0090396 A1 Apr. 11, 2013

(51) Int. Cl.
B01J 47/12 (2006.01)
C08J 5/22 (2006.01)

(52) U.S. Cl.
CPC ............... B01J 47/12 (2013.01); C08J 5/2231 (2013.01); C08J 2333/20 (2013.01)

(58) Field of Classification Search
USPC .................................... 521/27, 38; 428/36.91
See application file for complete search history.

(56) References Cited

U.S. PATENT DOCUMENTS

| 6,344,584 | B2 | 2/2002 | Lin |
| 6,380,456 | B1 | 4/2002 | Goldman |
| 7,098,327 | B2 | 8/2006 | Marshall |
| 7,968,663 | B2* | 6/2011 | MacDonald et al. ......... 526/304 |
| 2001/0025790 | A1* | 10/2001 | Thrier et al. .................. 204/435 |
| 2002/0077035 | A1* | 6/2002 | Wang et al. ...................... 451/41 |
| 2003/0100674 | A1* | 5/2003 | Mueller et al. ............... 524/819 |
| 2009/0087469 | A1 | 4/2009 | Zhang et al. |
| 2010/0143286 | A1 | 6/2010 | Matyjaszewski et al. |
| 2010/0180865 | A1 | 7/2010 | Vendulet et al. |
| 2012/0231195 | A1* | 9/2012 | Pohl et al. .................. 428/36.91 |

FOREIGN PATENT DOCUMENTS

WO 2005102503 A1 11/2005
WO WO-2005/102503 A1 * 11/2005

OTHER PUBLICATIONS

Journal of Membrane Science; "Development and Characterization of Crosslinked Ionomer Membranes based upon Sulfinated and Sulfonated PSU Crosslinked PSU Blend Membranes by Disproportionation of Sulfinic Acid Groups", Authors: Jochen Kerres, Wie Cui, Ralf Disson and Wolfgang Neubrand; Feb. 18, 1998 vol. 139, Issue 2, pp. 211-225.
Journal of Membrane Science; "Magnetic Ion-Exchange Nanoparticles and their Application in Proton Exchange Membranes", Authors: Smita B. Brijmohana and Montgomery T. Shaw; Oct. 15, 2007 vol. 303, Issues 1-2, pp. 64-71.

(Continued)

Primary Examiner — Peter D Mulcahy
Assistant Examiner — Henry Hu
(74) Attorney, Agent, or Firm — GE Global Patent Operation

(57) ABSTRACT

An ion exchange polymer composition is provided, which includes a primary crosslinker and a secondary crosslinker. The primary crosslinker includes a crosslinked ionic monomer including a quaternary ammonium group. A method for making the ion exchange polymer composition and materials prepared from the ion exchange polymer composition are also provided.

6 Claims, 1 Drawing Sheet

(56) References Cited

OTHER PUBLICATIONS

Carbohydrate Polymers; "Interpenetrating Polymer Network Microcapsules of Gellan Gum and Egg Albumin Entrapped with Diltiazem-Resin Complex for Controlled Release Application", Authors: Kulkarni, et al; Jan. 10, 2011 vol. 83, Issue 2, pp. 1001-1007.

Solid State Ionics; "Preparation and Characterization of Crosslinked Proton Conducting Membranes based on Chitosan and PSSA-MA Copolymer", Authors: Jin Ah Seo, et al; Jun. 25, 2009, vol. 180, Issues 14-16, pp. 998-1002.

Search Report and Written Opinion from corresponding PCT Application No. PCT/US2012/053770 dated Mar. 1, 2013.

* cited by examiner

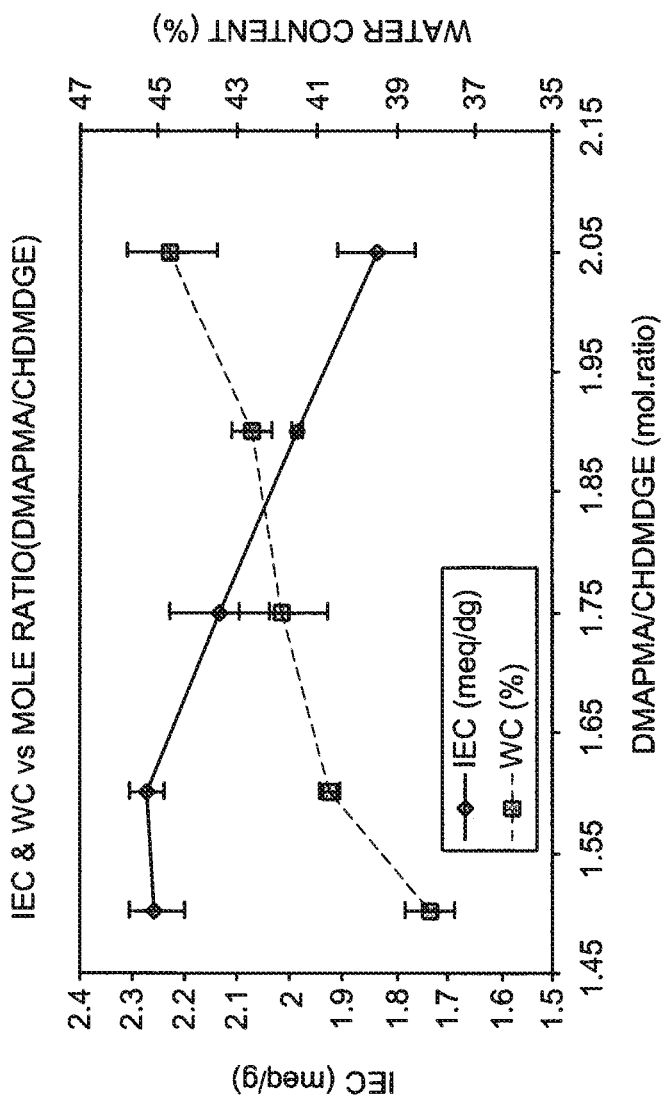

ION EXCHANGE COMPOSITIONS, METHODS FOR MAKING AND MATERIALS PREPARED THEREFROM

FIELD OF THE INVENTION

This invention relates to ion exchange polymer compositions, and more particularly, to crosslinked ion exchange polymer compositions and ion exchange materials prepared from these polymer compositions having low water content and good ion exchange capacity.

BACKGROUND OF THE INVENTION

Ion exchange materials are commonly employed to treat and remove ionizable components from fluids for a variety of applications. Flow-through beds or flow-through devices for fluid treatment may employ exchange material or components in the form of grains, fabrics or membranes. The ion exchange functionality operates to transport one type of ion across the material in an electric field, while substantially or effectively blocking most ions of the opposite polarity. Anion exchange polymers and materials carry cationic groups, which repel cations and are selective to anions. Cation exchange polymers and materials carry anionic groups, which repel anions and are selective to cations.

Increasing crosslinking density in ion exchange polymers can improve the mechanical integrity of ion exchange materials prepared from the polymers and reduce water content, but increasing the crosslinking density can also reduce the ion exchange capacity of the material to unacceptable levels.

U.S. Pat. No. 7,968,663, which is incorporated herein by reference, discloses anion exchange polymers prepared from the polymerization of a crosslinked quaternary ammonium monomer (primary crosslinker).

It would be desirable to prepare ion exchange polymers and materials having low water content, increased crosslinking density and good ion exchange capacity for the polymers and materials.

SUMMARY OF THE INVENTION

In one embodiment, an ion exchange polymer composition includes a primary crosslinker and a secondary crosslinker, wherein the primary crosslinker includes a crosslinked ionic monomer including a quaternary ammonium group.

In another embodiment, a method for making an ion exchange polymer composition includes polymerizing a primary crosslinker with a secondary crosslinker, wherein the primary crosslinker includes a crosslinked ionic monomer including a quaternary ammonium group.

In another embodiment, a membrane includes an ion exchange polymer composition including a primary crosslinker and a secondary crosslinker, wherein the primary crosslinker includes a crosslinked ionic monomer including a quaternary ammonium group.

The various embodiments provide ion exchange polymer compositions with increased crosslinking density that are chemically resistant and non-fouling. The compositions produce materials, such as membranes, at lower cost with improved mechanical properties, smooth surfaces, good ion exchange capacity and a low and more controllable water uptake.

BRIEF DESCRIPTION OF THE DRAWINGS

The FIGURE is a graph illustrating the ion exchange capacity (IEC) and water content of an ion exchange membrane vs. the mole ratio of a tertiary amine (DMAPMA) to cyclohexanedimethanol diglycidyl ether in the primary crosslinker.

DETAILED DESCRIPTION OF THE INVENTION

The singular forms "a," "an" and "the" include plural referents unless the context clearly dictates otherwise. The endpoints of all ranges reciting the same characteristic are independently combinable and inclusive of the recited endpoint. All references are incorporated herein by reference.

The modifier "about" used in connection with a quantity is inclusive of the stated value and has the meaning dictated by the context (e.g., includes the tolerance ranges associated with measurement of the particular quantity).

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

In one embodiment, an ion exchange polymer composition includes a primary crosslinker and a secondary crosslinker, wherein the primary crosslinker includes a crosslinked ionic monomer including a quaternary ammonium group.

In one embodiment, an ion exchange polymer composition may be an anion with cationic groups. The primary crosslinker includes a crosslinked ionic monomer. In one embodiment, the ionic monomer includes at least one cationic quaternary ammonium group. In another embodiment, the ionic monomer includes at least one vinyl group, such as an acrylic group. In another embodiment, the ionic monomer includes at least two ionic functional groups and at least two vinyl groups.

In one embodiment, the crosslinked ionic monomer may be prepared by reacting a polyepoxide with a tertiary amine including an acrylic group in the presence of an acid.

The tertiary amine may be an ethylenic tertiary amine. Examples of an ethylenic tertiary amine with acrylic groups include dimethylaminopropylmethacrylamide (DMAPMA), dimethylaminopropylacrylamide (DMAPAA), diethylaminopropylmethacrylamide (DEAPMA), or dimethylaminoethylmethacrylate (DMAEMA).

The polyepoxide may be any type of polyepoxide including at least two epoxide groups. In one embodiment, the polyepoxide is a diglycidyl ether or a triglycidyl ether. Diglycidyl ethers include, but are not limited to, diethylene glycol diglycidyl ether, diglycidyl 1,2-cyclohexanedicarboxylate, N,N-diglycidyl-4-glycidyloxyaniline, bisphenol A diglycidyl ether, brominated bisphenol A diglycidyl ether, bisphenol F diglycidyl ether, 1,4-butanediol diglycidyl ether, 1,4-butanediyl diglycidyl ether, 1,4-cyclohexanedimethanol diglycidyl ether, glycerol diglycidyl ether, resorcinol diglycidyl ether, bis[4-(glycidyloxy)phenyl]methane, bisphenol A propoxylate diglycidyl ether, dimer acid diglycidyl ester, ethylene glycol diglycidyl ether, brominated neopentyl glycol diglycidyl ether, diglycidyl ether-terminated poly(dimethylsiloxane), poly(ethylene glycol)diglycidyl ether, poly(propyleneglycol)diglycidyl ether, 1,2,3-propanetriol glycidyl ether and 1,3-butanediol diglycidyl ether. Triglycidyl ethers include, but are not limited to, tris(2,3-epoxypropyl)isocyanurate, trimethylolpropane triglycidyl ether, tris(4-hydroxyphenyl)methane triglycidyl ether 2,6-tolylene diisocyanate, tris(4-hydroxyphenyl)methane triglycidyl ether, glycerol propoxylate triglycidyl ether and trimethylolethane triglycidyl ether.

In another embodiment, the polyepoxide is a diepoxide. Diepoxides include, but are not limited to, 1,3-butadiene-diepoxide, 1,3-butadiene diepoxide, dicyclopentadiene dioxide, methyl cis,cis-11,12; 14,15-diepoxyeicosanoate.

The acid may be any type of acid, such as a mineral acid. In one embodiment, the acid includes, but is not limited to, hydrochloric acid, methane sulfonic acid, sulfuric acid or phosphoric acid. In one embodiment, the acid is present in an amount of from about 75 percent by mole weight to about 125 percent by mole weight, based on the mole weight of the tertiary amine. In another embodiment, the acid is present in an amount of from about 75 percent by mole weight to about 100 percent by mole weight, based on the mole weight of the tertiary amine.

The tertiary amine is quaternized and crosslinked in the reaction. In one embodiment, the temperature ranges from about 40° C. to about 150° C. In another embodiment, the temperature range is from about 60° C. to about 110° C. and in another embodiment, the temperature range is from about 75° C. to about 100° C. In one embodiment, the reaction time is from about 1 minute to about 2 hours. In another embodiment, the reaction time is from about 10 minutes to about 1 hour. In another embodiment, the reaction time is from about 20 minutes to about 45 minutes.

In one embodiment, the monomer is highly crosslinked. In another embodiment, the polymer is crosslinked in the range of from about 50 to about 100 percent. In another embodiment, the polymer is fully crosslinked.

The ionic polymer may be synthesized using a wide ratio range of the tertiary amine to the polyepoxide. In one embodiment, the ratio is from about 1.0 to about 2.5 moles of the tertiary amine to each equivalent mole of the polyepoxide. In another embodiment, the ratio is from about 1.5 to about 2.0 moles of the tertiary amine monomer per equivalent mole of the polyepoxide. In another embodiment, the ratio is about 1.5 moles of the tertiary amine monomer per equivalent mole of the epoxide.

In one embodiment, the crosslinked ionic monomer has structure I:

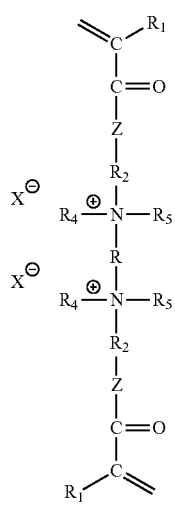

wherein R is —[CH$_2$—CH(OH)]$_2$—W; R$_1$ is hydrogen or a C$_1$-C$_{12}$ alkyl group; Z is oxygen or N—R$_3$; R$_2$ is —[CH$_2$]$_n$—; R$_3$ is hydrogen or —[CH$_2$]$_m$—CH$_3$; R$_4$ and R$_5$ are each, independently, —[CH$_2$]$_m$—CH$_3$; X is selected from the group consisting of Cl, Br, I and acetate; W is a bridging group or atom; m is an integer from 0 to 20; and n is an integer from 1 to 20.

In one embodiment, R$_1$ is a C$_1$-C$_6$ alkyl group. In another embodiment, R$_1$ is methyl, ethyl, propyl, butyl or isobutyl.

In one embodiment, Z is ammonia, trimethylammonia or triethylammonia.

W is a bridging group or atom. In one embodiment, W is a hydrocarbon group, an inorganic group or inorganic atom. In one embodiment, W is a C$_1$-C$_{30}$ alkyl group, C$_1$-C$_{30}$ alkyl ether group, C$_6$-C$_{30}$ aromatic group, C$_6$-C$_{30}$ aromatic ether group or a siloxane. In another embodiment, W is a C$_1$-C$_6$ alkyl group, C$_1$-C$_6$ alkyl ether group, a C$_6$-C$_{10}$ aromatic group or a C$_6$-C$_{10}$ aromatic ether group. In another embodiment, W is methyl, ethyl, propyl, butyl, isobutyl, phenyl, 1,2-cyclohexanedicarboxylate, bisphenol A, diethylene glycol, resorcinol, cyclohexanedimethanol, poly(dimethylsiloxane), 2,6-tolylene diisocyanate, 1,3-butadiene or dicyclopentadiene.

In one embodiment, m is an integer from 0 to 10. In another embodiment, m is an integer from 0 to 5. In another embodiment, n is an integer from 1 to 10. In another embodiment, n is an integer from 1 to 5.

A secondary crosslinker copolymerizes with the primary crosslinker to produce an ion exchange polymer having increased crosslinking density. The secondary crosslinker may be a non-ionic monomer. In another embodiment, the secondary crosslinker includes divinyllic functionality. In one embodiment, the secondary crosslinker may be N-methacrylamidomethyacrylamide.

The secondary crosslinker may be prepared by reacting an acrylamide compound with another acrylamide compound including hydroxyl groups. In one embodiment, the acrylamide may be methacrylamide (MAA). In another embodiment, the acrylamide including hydroxyl groups may be N-hydroxymethylacrylamide (NHMA). In one embodiment, the reaction occurs in the presence of an acid. In another embodiment, the reaction may proceed at room temperature.

The secondary crosslinker may be synthesized using a wide ratio range of the acrylamide and acrylamide including hydroxyl groups. In one embodiment, the ratio is from about 0.1 to about 1.5 moles of the acrylamide to the acrylamide including hydroxyl groups. In another embodiment, the ratio is from about 0.1 to about 0.5 moles of the acrylamide to the acrylamide including hydroxyl groups. In another embodiment, the ratio is from about 1.0 moles to about 1.5 moles of the acrylamide to the acrylamide including hydroxyl groups.

The acid may be any type of acid, such as a mineral acid. In one embodiment, the acid includes, but is not limited to, hydrochloric acid, methane sulfonic acid, sulfuric acid or phosphoric acid. In one embodiment, the amount of acid may be in a ratio of from about 0.1 mole to about 1.5 moles of the acid to the acrylamide including the hydroxyl groups. In another embodiment, the amount of acid may be in a ratio of from about 0.1 mole to about 1.0 mole of the acid to the acrylamide including the hydroxyl groups. In another embodiment, the amount of acid may be in a ratio of from about 0.1 mole to about 0.5 mole of the acid to the acrylamide including the hydroxyl groups.

In another embodiment, a method for making an ion exchange polymer composition includes polymerizing a primary crosslinker with a secondary crosslinker, wherein the primary crosslinker includes a crosslinked ionic monomer including a quaternary ammonium group. The primary crosslinker and secondary crosslinker are described above.

Polymerization of the primary and secondary crosslinkers may be carried out by any means suitable for polymerizing and covalently bonding the primary and secondary crosslinkers. In one embodiment, the polymerization may be photochemically with the addition of a photoiniator. Non-limiting examples of photoiniators include benzophenone, benzyl, antraquinone, eosin or methylene blue.

In another embodiment, the polymerization may be by heating the reactants and monomers to a suitable temperature and for a time sufficient to covalently crosslink the compounds. In one embodiment, the temperature range is from about 40° C. to about 150° C. In another embodiment, the temperature range is from about 60° C. to about 110° C. and in another embodiment, the temperature range is from about 75° C. to about 100° C. In one embodiment, the reaction time is from about 1 minute to about 2 hours. In another embodiment, the reaction time is from about 10 minutes to about 1.5 hours. In another embodiment, the reaction time is from about 30 minutes to about 1.5 hours.

Polymerization may be conducted in the presence of an acid. In one embodiment, the acid is a mineral acid. In another embodiment, the acid includes, but is not limited to, hydrochloric acid, methane sulfonic acid, sulfuric acid or phosphoric acid. The acid may be added in an amount of from about 1 percent by weight to about 5 percent by weight, based on the weight of the reaction mixture.

A catalyst may be added to aid in polymerization. The catalyst may be spontaneously activated or activated by heat, electromagnetic radiation, electron beam radiation or by chemical promoters. The catalyst may be added in any amount suitable for aiding in polymerization. In one embodiment, the catalyst is in an amount of from about 0.1 to about 5.0 percent by weight of the reaction mixture. In another embodiment, the catalyst may be added in an amount of from about 0.5 percent by weight to about 3.0 percent by weight, based on the weight of the reaction mixture. In another embodiment, the catalyst may be added in an amount of from about 0.5 percent by weight to about 1.0 percent by weight, based on the weight of the reaction mixture.

In one embodiment, the catalyst is a radical polymerization initiator or a photopolymerization iniator. In one embodiment, the catalyst is a peroxide. The peroxide includes, but is not limited to, methyl ethyl ketone peroxide and dibenzoyl peroxide. In another embodiment, the catalyst is a water soluble or oil soluble azo initiator. The azo initiator includes, but is not limited to, 2,2'-azobis[2-(2-imidazolin-2-yl)propane]dihydrochloride, 2,2'-azobis(N,N'-dimethylene isobutyramidine)dihydrochloride, 2,2'-azobis(2-methylpropionamidine)dihydrochloride, 2,2'-azobis[N-(2-carboxyethyl)-2-methylpropionamidine]hydrate, 2,2'-azobis{2-[1-(2-hydroxyethyl)-2-imidazolin-2-yl)propane], 2,2'-azobis[2-methyl-N-(2-hydroxyethyl)propionamide] and dimethyl 2,2'-azobis(2-methylpropionate).

The term "chemical promoters" as used herein refers to a substance, which increases the rate of polymerization either by itself or in combination with another catalyst. UV radiation polymerization agents can become more efficient in the presence of chemical promoters, which are photoinitiators or chemical compounds that generate free radicals. For example, methyl ethyl ketone peroxide can function as a catalyst itself, but its rate of initiation can be greatly increase by small amounts of transition metal salt chemical promoters, such as, for example, cobalt naphthenate. Similarly, dibenzoyl peroxide can function as a catalyst itself, but its action be accelerated by a dimethylaniline chemical promoter. Non-limiting examples of photoinitiating chemical promoters include benzophenone, benzyl, antraquinone, eosin and methylene blue.

In one embodiment, the components are combined in the presence of a solvent. Any solvent is suitable for use in this embodiment, so long as the solvent is not itself polymerizable and the components are soluble in it. Solvents suitable in this embodiment include, but are not limited to, water, polyethylene glycols, dimethylsulfoxide, 2-pyrrolidone, N-methyl pyrrolidone and mixtures thereof.

The amount of solvent is added in any amount suitable for solubilizing the components. In one embodiment, the amount of solvent is from about 10 to about 90 percent by weight based on the total weight of the reaction mixture. In another embodiment, the amount of solvent is from about 20 to about 70 percent by weight based on the total weight of the reaction mixture. In another embodiment, the amount of solvent is from about 25 to about 50 percent by weight based on the total weight of the reaction mixture.

The components are combined and reacted in any conventional manner. The order of addition is not critical and the components may be added in any order.

Ion exchange materials may be prepared from the ion exchange polymer compositions. In one embodiment, the ion exchange material may be an ion exchange membrane. In one embodiment, a membrane includes an ion exchange polymer composition including a primary crosslinker and a secondary crosslinker, wherein the primary crosslinker includes a crosslinked ionic monomer including a quaternary ammonium group. The ion exchange polymer composition, primary crosslinker and secondary crosslinker are described above.

In one embodiment, the ion exchange polymer composition may be applied to a base or support membrane to provide ionic functionality to the membrane. In one embodiment, a membrane may be formed by reinforcing a support fabric with the ion exchange polymer composition. In another embodiment, a liquid mixture of the primary crosslinker and secondary crosslinker may be applied to the fabric by casting the liquid mixture onto the fabric or by soaking the fabric in the liquid mixture using individual pieces of fabric, multiple pieces of fabric arranged in stacks or with fabric from a roll in a continuous process.

The base or support membrane may have any thickness suitable for preparing the desired membrane. In one embodiment, the thickness is from about 1 mil to about 75 mils. In another embodiment, the thickness is from about 1 mil to about 50 mils. In another embodiment, the thickness is from about 1 mil to about 20 mils. In another embodiment, the thickness is from about 1 mil to about 10 mils.

Polymerization occurs between the primary and secondary crosslinkers to form a dual-crosslinked ion exchange membrane supported by a fabric. In one embodiment, polymerization can occur photochemically. In another embodiment, polymerization can occur upon heating the membrane. In one embodiment, the temperature range is from about 40° C. to about 150° C. In another embodiment, the temperature range is from about 60° C. to about 110° C. and in another embodiment, the temperature range is from about 75° C. to about 100° C. In one embodiment, the reaction time is from about 1 minute to about 2 hours. In another embodiment, the reaction time is from about 10 minutes to about 1.5 hours. In another embodiment, the reaction time is from about 30 minutes to about 1.5 hours.

In another embodiment, the membrane may be formed by imbibing a porous plastic film, such as polyethylene, polypropylene or Teflon®, with the ion exchange polymer composition. For example, a liquid mixture of a primary crosslinker and secondary crosslinker can be applied to the porous plastic film by casting the liquid monomer mixture onto the porous plastic film or by soaking the porous plastic film in the liquid mixture. Polymerization occurs between the crosslinkers to form a dual-crosslinked ion exchange membrane supported by a porous plastic film. In one embodiment, polymerization can occur photochemically. In another embodiment, polymerization can occur upon heating the membrane. In one embodiment, the temperature range is from about 40° C. to about 150° C. In another embodiment, the temperature range is from about 60° C. to about 110° C. and in another embodiment, the temperature range is from about 75° C. to about 100° C. In one embodiment, the reaction time is from about 1 minute to about 2 hours. In another embodiment, the reaction time is from about 10 minutes to about 1.5 hours. In another embodiment, the reaction time is from about 30 minutes to about 1.5 hours.

In another embodiment, the primary and secondary crosslinkers can be polymerized into a solid mass, processed and pulverized into small particles. The small particles can then be blended in an extruder and heated with a melted plastic, such as polyethylene or polypropylene. The plastic and ion exchange mixture can then be extruded into thin sheets of ion exchange membranes.

The water content is a measurement of the amount of water absorbed by an ionic membrane. In one embodiment, the ion exchange membrane has a water content of from about 30% to about 50%. In another embodiment, the membrane has a water content of from about 36% to about 47%. In another embodiment, the membrane has a water content of from about 37% to about 45%. In another embodiment, the membrane has a water content of from about 37% to about 39%. In another embodiment, the membrane has a water content of about 38%.

In one embodiment, the membrane has an ion exchange capacity (IEC) of from about 1.2 meq/g to about 2.4 meq/g. In another embodiment, the membrane has an IEC of from about 1.5 meq/g to about 2.4 meq/g. In another embodiment, the membrane has an IEC in the range of from about 1.7 meq/g to about 2.4 meq/g. In another embodiment, the membrane has an IEC of from about 2.1 meq/g to about 2.4 meq/g. In another embodiment, the IEC value is from about 2.2 meq/g to about 2.3 meq/g.

In order that those skilled in the art will be better able to practice the present disclosure, the following examples are given by way of illustration and not by way of limitation.

EXAMPLES

Example 1

The pre-curing solution was made from two solutions. Solution 1 was for the primary crosslinking monomer and solution 2 was for the secondary crosslinking monomer.

Solution 1:
27.67 g DMAPMA was measured into a 250-ml beaker. 21.34 g of deionized water was added to the beaker and the solution was stirred for 10 min using a magnetic stirrer. 15.53 g hydrochloric acid was added to the solution at a rate so that the temperature did not rise above 60° C. After the addition of the acid, 27.77 g of a cyclohexanedimethanol diglycidyl ether was added to the solution. The solution was heated to 78° C. and stirred for 30 minutes. After 30 minutes, the solution was cooled to room temperature.

Solution 2:
4.50 g NHMA was measured into a 100 ml beaker and 2.16 g HCl was added slowly at a rate so that the temperature did not rise above 40° C. 1.82 g MAA was then added to the solution and the reaction mixture was stirred using a magnetic stirrer at room temperature for 15 min. After 15 min, 0.8 g of 2,2'-azobis[2-(2-imidazolin-2-yl)propane]dihydrochloride supplied by Wako Chemicals USA, Dallas, Tex. (VA-044) was added and the solution stirred for another 15 minutes or until all of the catalyst dissolved.

The final mix was prepared by adding solution 2 to solution 1 and stirring the reaction mixture for about 10 min. The total mix quantity of the combined solutions was 100 g.

A 6"×6" mylar sheet was place onto a 6"×6" glass plate and the solution mixture was spread onto the mylar sheet. An acrylic cloth was placed on the mylar sheet and the mix was allowed to spread across the cloth. Another 6"×6" mylar sheet was placed on the cloth and excess solution mix was wiped off the cloth. Another 6"×6" glass plate was placed on the second mylar sheet and the glass/mylar/cloth/mylar/glass sandwich structure was clamped using binder clips. The sandwich was placed in the oven at 85° C. for 60 min for curing. After curing, the membrane envelope was removed from the oven, cooled for 15 min and the glass plates were pried open. The mylar sheets were then carefully separated from the membrane. The membrane was placed in deionized water for at least 4 hours and analyzed. IEC and water content were measured. Results are shown in the FIGURE.

Additional membranes were prepared in accordance with Example 1 except that the mole ratio of DMAPMA to cyclohexanedimethanol diglycidyl ether was varied. The results and mole ratios are shown in the FIGURE. The thicknesses of the membranes were in the range of 0.55 mm to 0.70 mm. The resistivity varied from 15 to 22 Ohm-cm$^2$. The smoothness factor was 4 to 4.5.

The ion exchange capacity (IEC) was expressed as milligram-equivalents per gram of dry ion exchange resin in the nitrate form (i.e., not including fabric). The water content (WC) was expressed as percent by weight of the wet ion exchange resin in the nitrate form (i.e., not including fabric). The smoothness factor was determined by visually comparing the membrane to a commercial membrane having a smoothness factor of 5.

While typical embodiments have been set forth for the purpose of illustration, the foregoing descriptions should not be deemed to be a limitation on the scope herein. Accordingly, various modifications, adaptations and alternatives may occur to one skilled in the art without departing from the spirit and scope herein.

What is claimed is:

1. A method for making an ion exchange polymer composition comprising polymerizing a primary crosslinker with a secondary crosslinker, wherein the primary crosslinker comprises a crosslinked ionic monomer including a quaternary ammonium group, wherein the crosslinked ionic monomer including a quaternary ammonium group is prepared by a chemical reaction prior to a polymerizing reaction between the primary crosslinker and the secondary crosslinker.

2. The method of claim 1, wherein the crosslinked ionic monomer including a quaternary ammonium group is prepared by chemically reacting polyepoxide with a tertiary amine including an acrylic group or an acrylamide group, in the presence of an acid.

3. The method of claim 2, wherein the tertiary amine and polyepoxide are in a molecular ratio of from about 1.0 to about 2.5 moles of the tertiary amine to each equivalent mole of the polyepoxide.

4. The method of claim 1, wherein the crosslinked ionic monomer has structure I:

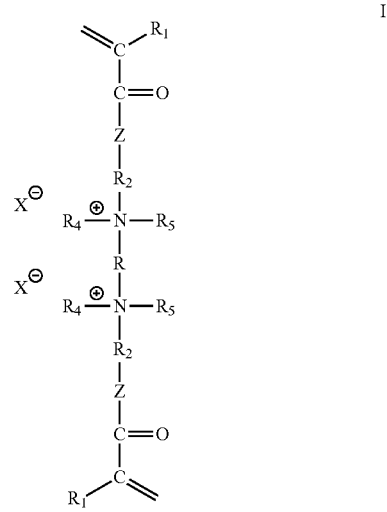

wherein R is —[CH$_2$—CH(OH)]$_2$—W; R$_1$ is hydrogen or a C$_1$-C$_{12}$ alkyl group; Z is oxygen or N—R$_3$; R$_2$ is —[CH$_2$]$_n$—; R$_3$ is hydrogen or —[CH$_2$]$_m$—CH$_3$; R$_4$ and R$_5$ are each, independently, —[CH$_2$]$_m$—CH$_3$; X is selected from the group consisting of Cl, Br, I and acetate; W is a bridging group or atom; m is an integer from 0 to 20; and n is an integer from 1 to 20.

5. The method of claim 1, wherein the secondary crosslinker is prepared by reacting an acrylamide compound with another acrylamide compound including hydroxyl groups.

6. The method of claim 1, wherein the primary and secondary crosslinkers are polymerized by heating the reactants.

* * * * *